(12) United States Patent
Berenbaum et al.

(10) Patent No.: US 9,612,977 B2
(45) Date of Patent: Apr. 4, 2017

(54) METHOD AND SYSTEM FOR CONTROLLING ACCESS TO EMBEDDED NONVOLATILE MEMORIES

(75) Inventors: Alan Berenbaum, New York, NY (US); Richard Wahler, St. James, NY (US)

(73) Assignee: STANDARD MICROSYSTEMS CORPORATION, Happauge, NY (US)

( * ) Notice: Subject to any disclaimer, the term of this patent is extended or adjusted under 35 U.S.C. 154(b) by 521 days.

(21) Appl. No.: 13/183,441

(22) Filed: Jul. 15, 2011

(65) Prior Publication Data

US 2013/0019305 A1 Jan. 17, 2013

(51) Int. Cl.
G06F 12/14 (2006.01)
G06F 21/79 (2013.01)
G06F 21/57 (2013.01)
G06F 21/44 (2013.01)
H04L 9/32 (2006.01)

(52) U.S. Cl.
CPC ...... *G06F 12/1408* (2013.01); *G06F 12/1416* (2013.01); *G06F 12/1466* (2013.01); *G06F 21/44* (2013.01); *G06F 21/57* (2013.01); *G06F 21/79* (2013.01); *H04L 9/3226* (2013.01)

(58) Field of Classification Search
CPC ........ H04L 9/0894–9/0897; H04L 9/32; H04L 9/3226–9/3234; H04L 9/3271–9/3278; H04L 63/083–63/0846; G06F 12/14–12/1491; G06F 21/44–21/445; G06F 21/57–21/577; G06F 21/604; G06F 21/62; G06F 21/78–21/805; G06F 2221/0797

USPC ................ 711/164; 726/7, 17–20, 26–30, 34
See application file for complete search history.

(56) References Cited

U.S. PATENT DOCUMENTS

| | | | |
|---|---|---|---|
| 6,199,163 B1 * | 3/2001 | Dumas et al. | 713/183 |
| 7,343,496 B1 * | 3/2008 | Hsiang et al. | 713/194 |
| 2006/0184799 A1 * | 8/2006 | Seo et al. | 713/182 |
| 2007/0237325 A1 * | 10/2007 | Gershowitz et al. | 380/30 |
| 2009/0196418 A1 * | 8/2009 | Tkacik | G06F 21/72 380/46 |
| 2010/0070777 A1 * | 3/2010 | Salters et al. | 713/189 |
| 2010/0088527 A1 * | 4/2010 | Johnson et al. | 713/193 |
| 2011/0154501 A1 * | 6/2011 | Banginwar et al. | 726/26 |

* cited by examiner

*Primary Examiner* — Alexander Lagor
*Assistant Examiner* — Kevin Bechtel
(74) *Attorney, Agent, or Firm* — Slayden Grubert Beard PLLC

(57) ABSTRACT

A system to control access to a nonvolatile memory. The system includes an embedded controller, and a nonvolatile memory including a password. The embedded controller and the nonvolatile memory may be in communication with one another. The system further includes a lock register receiving and storing the password from the nonvolatile memory, and a key register receiving a key from the embedded controller and holding the key for one machine cycle. Further, the system includes a comparator connected between the lock register and the key register. The comparator compares the password received from the lock register and the key received from the key register. Output from the comparator is provided to an access filter connected between the embedded controller and the nonvolatile memory. Based on the comparator output, the access filter may grant or block access to the nonvolatile memory.

12 Claims, 3 Drawing Sheets

METHOD AND SYSTEM FOR CONTROLLING ACCESS TO EMBEDDED NONVOLATILE MEMORIES

TECHNICAL FIELD

The present disclosure relates to computing devices, and more particularly to embedded nonvolatile memories.

BACKGROUND

Embedded circuits or System-on-Chip (SoC) devices refer to integrated chips, which include components of a computer or other electronic system. The chips may include digital, analog, mixed-signal, and often radio frequency functions—all on a single substrate. These chips also include a nonvolatile memory in communication with an on-chip controller. From time to time, customers may wish to store secret data, such as passwords, authentication keys, bank account details, or any other such confidential information in the nonvolatile memory.

One such embedded system is an Electronic Fund Transfer Point of Sale (EFTPOS) terminal often used by retail stores to receive payments made through debit or credit cards. These POS terminals are typically coupled to a financial institution via an electronic communication link. When the cashier swipes a card, the terminal reads an account number encoded on the card. The customer then, for identification purposes, enters a personal identification number (PIN) into a keypad device, and the terminal encrypts and sends this information to the financial institution, which debits the corresponding customer's account and returns a confirmation to the POS terminal. During this process, sensitive financial and identification information, together with encryption information, is entered and stored in the terminal's nonvolatile memory.

Unfortunately, hackers and thieves can easily obtain this information from the POS terminal. For example, a thief could steal a terminal and then download the contents of the secure memory, using any one of a number of programs. Alternatively, the thief could surreptitiously load a monitor program into the POS terminal of an unsuspecting merchant. The monitor program would then record and output sensitive information to the thief over time. Similarly, a hacker could use an onboard or external debugger to extract sensitive information. Debuggers can stop the execution of instructions, read/write memory contents, inject and execute new instructions, and cause the processor to output memory contents.

Due to such security threats, memory access control is a primary concern for devices that store confidential information. Access control systems should preferably grant access to trusted sources such as genuine software or controllers attempting to access the memory, yet deny access to suspicious software or malware. Moreover, as hackers can replicate genuine software in an attempt to extract confidential data from the memory, the access control system should be able to discern unauthorized software and prevent access. To provide these solutions, developers of the trusted computing group (TCG) have introduced an access control system—Trusted Platform Module (TPM).

A TPM is a computer chip (microcontroller) that can securely store artifacts used to authenticate a platform, such as an operating system, a driver, software, or firmware. These artifacts can include certificates, or encryption keys. The TPM can also store platform measurements that help ensure that the platform remains trustworthy. Authentication (ensuring that the platform can prove what it claims to be) and attestation (proving that a platform is trustworthy) are steps employed by the TMP to ensure safer computing in all environments.

Though a TPM offers a secure solution, it requires a separate controller chip installed on a protected device. This controller chip is expensive, increasing the overall device cost. For desktops and laptops, the percentage increase in cost may be marginal; but in smaller and less expensive electronic systems, the percentage increase in cost may be much higher. Moreover, for embedded circuits and SoCs that require a simple access control mechanism for their on-board memory, TPM may provide 'too much of a solution.'

Therefore, there exists a need for a simple, easy to implement method and system to control access to data stored in nonvolatile memories, without adding expensive circuitry.

SUMMARY

Briefly described, and according to one embodiment, the present disclosure describes an access-protected embedded system. The system includes an embedded controller, and a nonvolatile memory including a password. The embedded controller and the nonvolatile memory may be in communication with one another. The system further includes a lock register receiving the password from the nonvolatile memory and storing the password, and a key register receiving a key from the embedded controller and holding the key for one machine cycle. Further, the system includes a comparator connected between the lock register and the key register. The comparator compares the password received from the lock register and the key received from the key register. Output from the comparator is provided to an access filter connected between the embedded controller and the nonvolatile memory. Based on the comparator output, the access filter may grant or block access to the nonvolatile memory.

According to another embodiment, the present disclosure describes a method for protecting access to a nonvolatile memory in an embedded system. The method includes the steps of comparing a password stored in the nonvolatile memory with a null value, and blocking access to the nonvolatile memory if the password is not equal to the null value. Next, the method compares the password with a key provided by an embedded controller. If the key matches the password, the method enables access to the nonvolatile memory; else, access is blocked.

Figure 1:
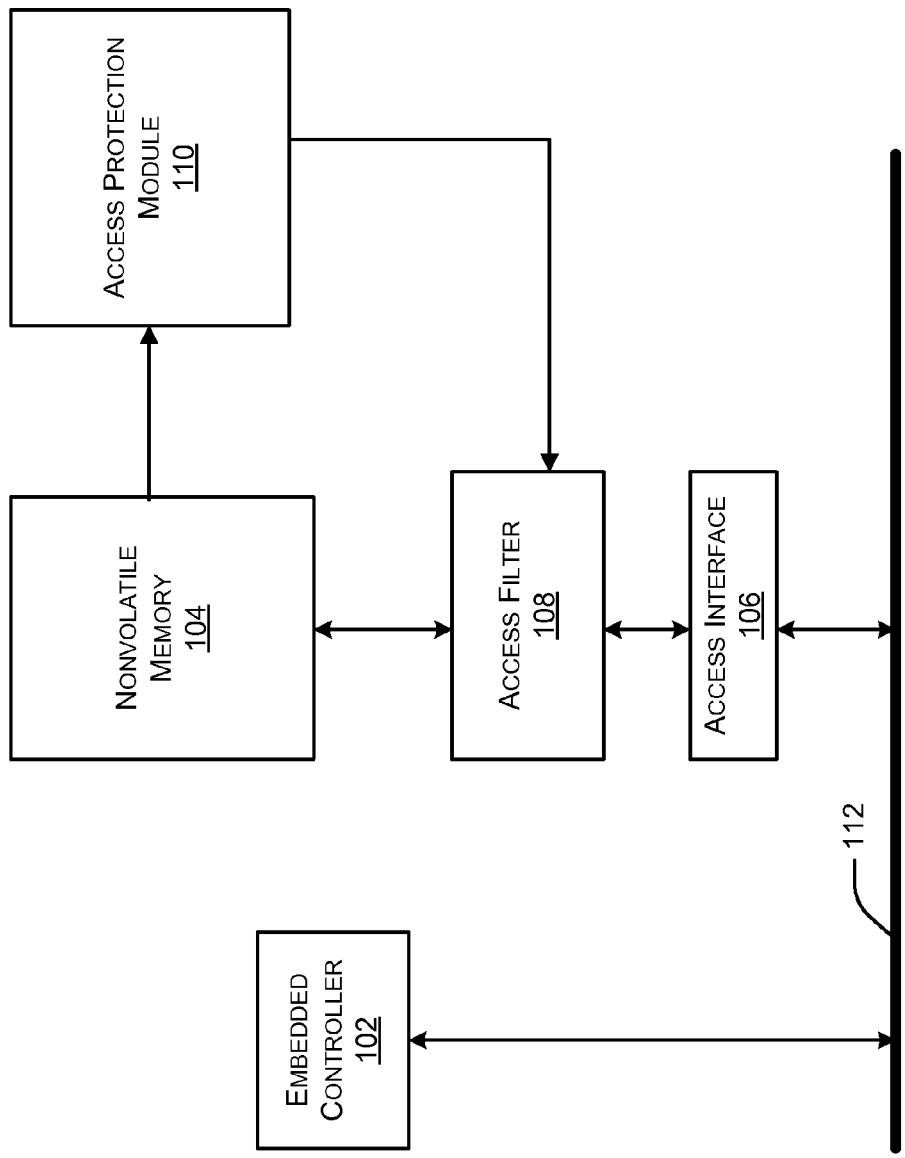
FIG. 1 illustrates an exemplary system for controlling access to a nonvolatile memory according to embodiments of the present disclosure.

While the disclosure is amenable to various modifications and alternative forms, specific embodiments are shown by way of example in the drawings and are described in detail. It should be understood, however, that the drawings and detailed description thereto are not intended to limit the disclosure to the particular form disclosed, but on the contrary, the intention is to cover all modifications, equivalents, and alternatives falling within the spirit and scope of the present disclosure as defined by the appended claims.

DETAILED DESCRIPTION

Overview

Customers may often wish to store confidential data in memory mediums associated with embedded systems or System-on-Chip (SoC) devices. For example, customers may store digital signatures, registered software keys, bank account passwords, or encryption keys, within system memory. Access to this sensitive information then becomes a concern, as users do not want unauthorized software to obtain access to this extremely personal and confidential information. To control data access, memory systems may be designed to block access to unauthorized users or software. Some issues remain with this security method, however. For example, hackers may develop unauthorized software, resembling the actual software, and gain access to the memory. Therefore, systems should be developed that can discern between unauthorized and authorized software. Moreover, the authorization system should be designed such that any software, malware, or firmware cannot compromise the access control system.

Embodiments of the present disclosure provide a simple and effective solution to protect data stored in non-volatile memories. This system can differentiate between unauthorized and authorized software and ensure that software or firmware does not compromise the system. To this end, the disclosed system employs a hardware-implemented lock and key mechanism to block unauthorized access to the memory.

The lock-and-key mechanism, which operates entirely in hardware, blocks access to the memory before firmware is booted, preserving security. To unlock the memory, software has to provide the right key. So, even compromised firmware cannot access the contents of the memory without proving that it is trustworthy (by using the proper key). Moreover, because the lock is held in a register and is not present on a communication bus, it is accessible by hardware only, preventing any possible compromise by firmware (or a debugger).

Exemplary Systems

One such exemplary access-protected system 100 is depicted in FIG. 1. The system 100 may be part of a personal computer, or a consumer device such as a cell phone, set-top box, television, point of sale (POS) terminal, or similar device. Further, the system 100 may include a controller 102, a memory 104, and an access interface 106. To control access to the memory 104, the system 100 may further include an access filter 108 and an access protection module 110. Communication between the controller 102 and the nonvolatile memory takes place via a communication bus 112, which also provides access to other portions of the host system, as desired.

The controller 102 may be an embedded controller, a micro-controller, a digital signal processor, a microprocessor, or an SoC controller. Functions of the controller 102 include controlling system operations, running operating systems or software, booting up, etc. Embedded controllers are widely known in the art, and therefore, they are not described here.

The memory 104 may be any suitable media, as desired. For example, the memory media 104 may be persistent or nonvolatile memory such as flash memory or it may be a removable memory medium. For example, the memory medium 104 may be a EEROM (Electrically Erasable Read-Only Memory), EEPROM (Electrically Erasable Programmable Read-Only Memory), or a memory card, such as secure digital (SD) card, a Multimedia Card (MMC), an electronic Multimedia card (eMMC), or a high-speed subscriber identity module (SIM) card, which stores information. It will be understood that many other nonvolatile memory media are present or may be developed in the future for use with computing devices. None of these memory media is outside the scope of the embodiments of the present disclosure. Further, the system 100 may support a single or multiple memory media 104 simultaneously or concurrently depending on the application or requirement.

The access interface 106 provides communication between the controller 102 and memory 104. A suitable device might be an access port, such as a direct memory access (DMA) interface. As illustrated, the access interface 106 communicates with the memory 104 through an I/O interface, and with the controller 102 through the communication bus 112. This bus 112 may be a high-speed data bus, an SoC bus, or an interconnect. Known communication bus architecture, such as the AMBA High-performance Bus (AHB), may be utilized here. The elements described immediately above are typical components present in an SoC or embedded circuit. Their operation is also similar to typical components known in the art.

Embodiments of the present disclosure introduce some new circuitry into the SoC design to control memory access. The access filter 108, for example, present at the input of the memory module 104, blocks or enables access to the memory 104. The access filter 108 may be operated by control signals, such as enable and block signals that permit access to the memory 104 or block it.

The access protection module 110 generates the control signals utilized by the access filter 108 to manage memory access. When suspicious software or firmware attempts to access the memory 104, the access protection system 110 generates a block signal. Alternatively, when the access protection system 110 ascertains that the software or firmware requesting access is genuine, it generates an enable signal. As long as the controller 102 executes the software, the access protection system 110 maintains the generated control signal. There may be situations, however, when the controller 102 suspects compromised firmware during execution. These situations may arise when a firmware update request is received, or an external debugging port is enabled. In these cases, the access protection system 110 may change an already implemented enable signal into a block signal, automatically blocking access until the suspicious situation has passed.

The access protection system 110 determines software authenticity using a lock-and-key approach. In this approach, the memory 104 includes a password and the software attempting to access the memory 104 includes a corresponding key. Whenever the software attempts to access the memory 104, its key is compared with the password. If the software includes the right key, the access protection system 110 generates an enable signal; if not, it generates a block signal. Passwords and keys may be set during manufacturing, while fitting the memory 104 in an embedded circuit, or while writing the software code. Moreover, the passwords may be stored in an internal register within the memory 104 that is not accessible by software.

By storing the password in the blocked memory itself, access control is maintained. Hackers cannot use software or any other means to determine this password as long as the memory 104 is blocked, and without the correct password, a hacker has no access to the contents of the nonvolatile memory. To decrease these possibilities further, a password that can withstand dictionary attacks may be selected.

The operation of the access protection system 110 will be described in the following sections.

Figure 2:
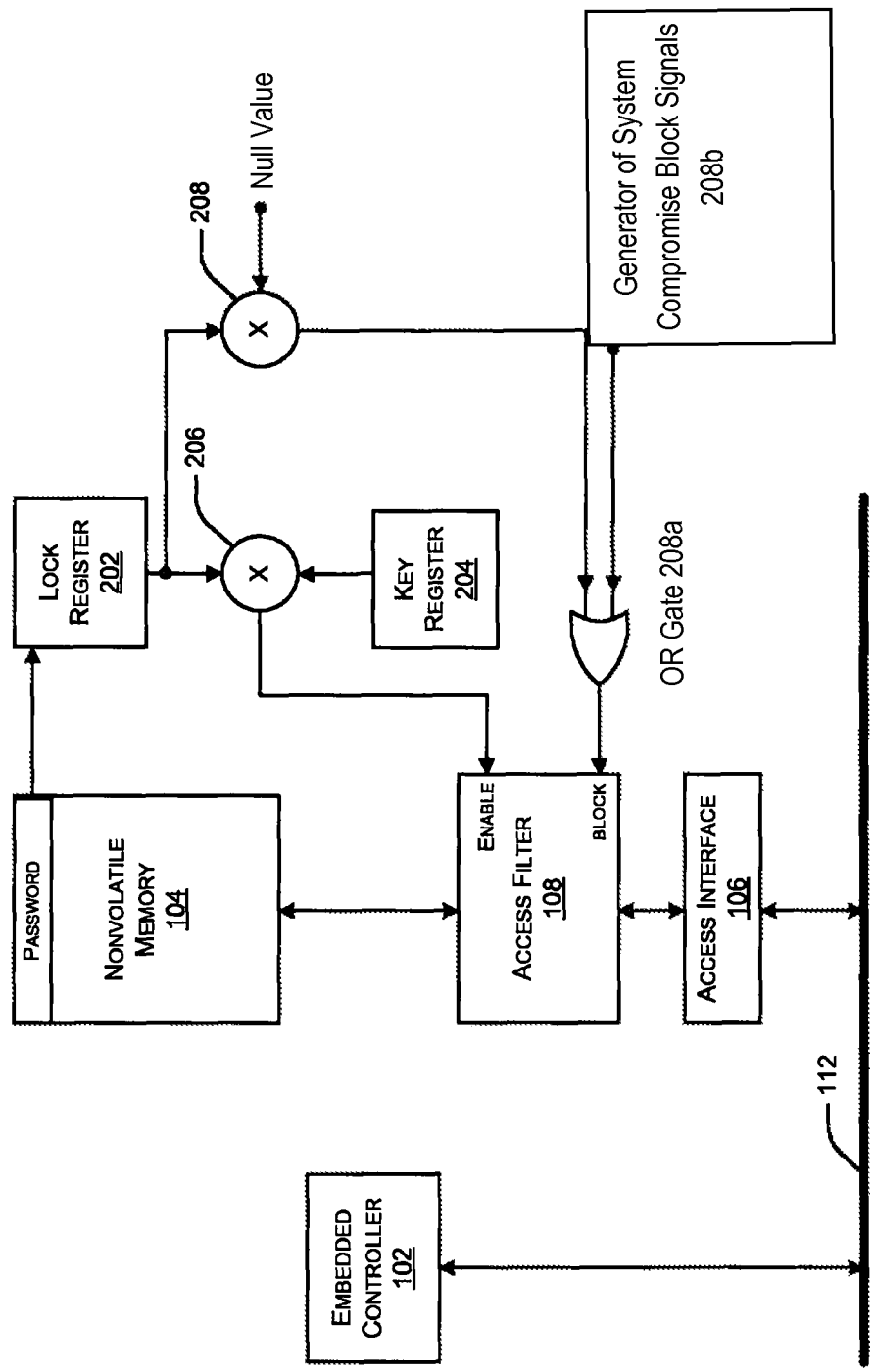
FIG. 2 illustrates the system of FIG. 1 in detail.

FIG. 2 illustrates the access protection system 110. Here, the access protection system 110 includes a lock register 202, a key register 204, a first comparator 206, and a second comparator 208. The lock register 202 stores the password, and it may be embodied by an internal memory register. This register is configured such that hardware (comparators) may access it, but not the controller 102 or software. The key register 204 is a temporary register that holds the software key for one machine cycle. Comparators 206, 208 may be digital comparators configured to compare binary values. Comparator 206 compares the password and key present in the lock and key registers respectively, and comparator 208 matches the password with a null value. The null value may be a reserved binary value that indicates no active password is assigned to the memory. Whenever the two inputs match, the comparators 206, 208 generate an enable signal (e.g., a binary one); otherwise, they generate a block signal (e.g., a binary zero). These signals serve as control signals for the access filter 108, as described previously. It will be understood that by using an active low logic or a complex combination of active low and active high logic, the enable signal may easily be represented by a binary zero, while the block signal may be represented by a binary one.

At power on, the system 100 enters a power on reset (POR) mode. In this mode, the hardware generates a pulse that resets the values in all the registers, erases all volatile memories, and resets the system 100 to a known state. Immediately after this mode, the comparator 208 compares the password stored in the memory 104 with a null value (such as decimal −1 or any other predefined value that indicates absence of a password). This comparison determines whether the memory 104 has any access protection. If the password is not equal to the null value, the comparator 208 generates a block signal, which blocks the access filter 108. It will be understood that the password is compared with the decimal value before the controller and its associated firmware begins operation. If the password is not a null value, it is saved in the lock register 202 and cannot be read or written directly by the controller 102 or any software. In this manner, an access-protected memory may be in a blocked state after the embedded chip powers on, but before the controller begins operation. Subsequently, whenever software or firmware attempt to access the memory 104, a key coded in the software is compared with the password.

To unblock the access filter 108, the controller 102 writes a key, embedded in the software code, in the key register 204. The comparator 206 compares the key to the password stored in the internal lock register 202. If the two values match, the comparator 206 generates an enable signal, unblocking the access filter 108. It will be understood that the key register 204 is not a real register that holds data for an extended time. Rather, this register holds the key only for one machine cycle, preventing any software from attempting to read the key. The comparator 206 compares the password and the key when the key is written to the key register 204. As the access filter 108 can be unblocked in a single cycle, there exists no need to hold the key in a physical register. This improves security, because malicious software cannot subvert the security mechanism by reading the key register 204.

The access filter 108 enables memory access when the controller 102 executes genuine software. There may come a time, however, when the controller's firmware may be compromised. These situations may arise, for example, when the system receives a firmware update request. A hacker, to extract information from the system, may create these updates. Alternatively, an external debugging port may be enabled, allowing an external master to access confidential data inside the memory 104. To preclude data theft during these compromised situations, the access protection system 110 includes a second mechanism to put the access filter 108 in the blocked state. In this case, the firmware or the hardware directly provides a block signal to the access filter 108 when it detects an external debugger or software update.

In one embodiment, the signal from the hardware or firmware 208*b* may be provided along with the comparator's 208 output signal to a logical OR gate 208*a*. The output of which is communicated to the access filter 108. Consequently, if any one of these input signals is a block signal, memory access is blocked. A correct key, presented by the update software or the external debugger, may then unblock the memory.

Thus, by storing the password in the access-controlled memory itself, the access protection system 110 provides robust protection without the need of a separate controller maintaining the passwords. Moreover, by implementing the memory lock completely in hardware and by comparing the password and key in one machine cycle, the access protection system 110 ensures that malicious software or firmware does not steal the password or key during implementation.

Exemplary Methods

Figure 3:
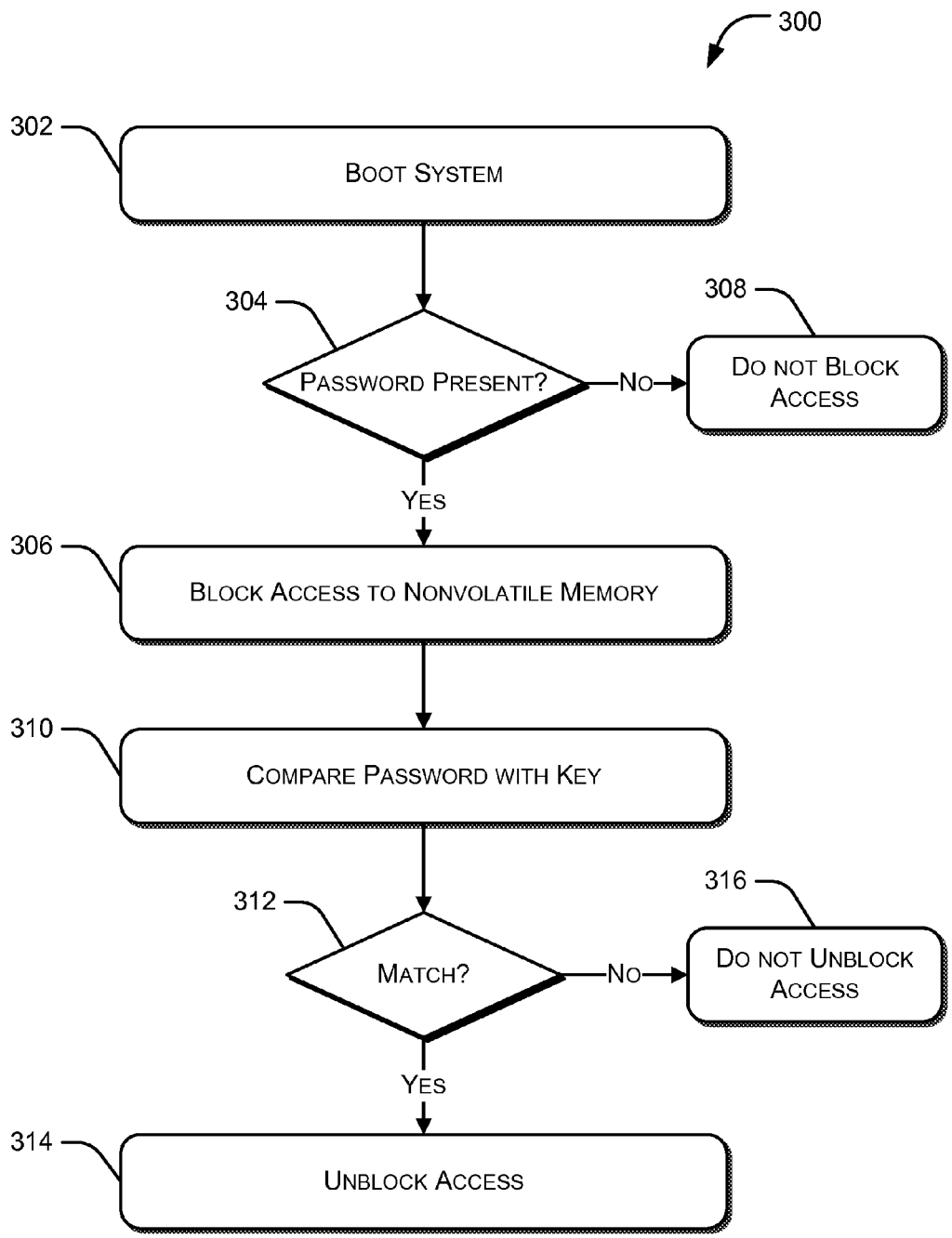
FIG. 3 is a flow chart illustrating a method for controlling access to a nonvolatile memory.

FIG. 3 is a flow chart illustrating an exemplary method 300 for controlling access to a nonvolatile memory 104 in an embedded system 100. The method 300 includes the steps of powering on the embedded system 100, checking for a password, and blocking access to the memory 104 if a password exists. These steps are carried out by the hardware whenever the embedded system 100 is powered on. The method further includes the steps of matching the password with a key present in a software attempting to access the memory 104, and if the key matches the password, enabling access to the memory 104. These steps are carried out by the controller, software, or firmware, and it will be understood that these steps may be executed any time after the controller boots up, potentially hours or even months after power on. It will be understood that the steps set out in this method may be combined, altered, or omitted in specific adaptations of the disclosure. Moreover, the order in which the steps execute may change without departing from the scope of the present disclosure. The illustrated steps are set out to explain the embodiment shown, and it should be anticipated that ongoing technological development would change the manner in which particular functions are performed.

At step 302, the embedded system 100 is powered on. At this step, the hardware resets the values in all the registers, erases all volatile memories, and resets the system 100 to a known state before booting the onboard operating system. This stage is typically referred to as a 'power on reset' (POR) stage.

At step 304, immediately after the POR state (but before the controller begins execution), the password stored in the nonvolatile memory 104 is compared with a null value in the comparator 208. This comparison determines whether password protection exists for the memory 104. If a password is not present (no path from step 304), the password value would be a null value. In this case, the comparator 208 may generate an enable signal, which permits access to the memory 104, allowing any firmware or software to gain access to memory 104 without checking for a key (at step 308). If the password exists, the comparator generates a block signal, which prevents any firmware or software to gain access to the memory 104 without the correct key (at step 306).

The password is stored in the lock register 202 after the POR stage. Once the password is set, the controller 102 begins the booting process. While booting, at step 310, the hardware comparator 206 compares a key present in the genuine software with the password. The key is written in the key register 204 for one machine cycle; during this cycle itself, the key is compared with the password. If, at step 312, they match, the comparator 206 provides an enable signal to the access filter 108, unblocking access to the memory 104. If they do not match, the comparator 206 provides a block signal to the access filter 108, blocking access.

Writing the key to the key register 204 and comparing it with the password is conducted in one machine cycle, so that the key is out in the open for a very limited time, minimizing hacking threats. Moreover, because the key is not stored in the key register 204 for an extended period, it is impossible for malicious software, firmware, or a debugger to steal the key by reading the register.

During the period the controller 102 is operational, the access filter 108 may enable access (if the comparing produced a favorable result). In certain situations, however, the firmware or hardware itself may block access to the memory 104 by providing a block signal 208b to the access filter 108. Such situations may include receiving software update requests, downloading software, installing new software, or detecting an external debugger on one or more system ports. In each situation, the firmware or hardware automatically blocks access to the memory 104. If the updated, downloaded, or installed software is genuine, it will include a key. This key is compared with the password. Again, if the key matches the password, access filter 108 grants access. When an external debugger is detected, the access protection module 110 may block the memory 104. The debugger can then access the memory 104 if it writes the correct password into the key register.

Those in the art will understand that these depictions do not limit the scope of the claimed invention, which is determined solely by reference to the appended claims. Systems and methods disclosed herein may be implemented in digital electronic circuitry, in computer hardware, firmware, software, or in combinations of them. Apparatus of the claimed invention can be implemented in a computer program product tangibly embodied in a machine-readable storage device for execution by a programmable processor such as a processor. A programmable processor or controller may perform the method steps according to the claimed invention.

What is claimed is:

1. An access-protected embedded system comprising:
   an embedded controller;
   a nonvolatile memory configured to store a password;
   an access filter device having a block input and an enable input, the access filter device being connected between the embedded controller and the nonvolatile memory and configured to block access to the nonvolatile memory when said block input is asserted and to grant access when the block input is not asserted and to further grant access to the nonvolatile memory when the enable input is asserted;
   a lock register configured to receive the password from the nonvolatile memory and to store the password;
   a key register configured to receive a key from the embedded controller and to hold the key for only a single machine cycle, the single machine cycle associated with the embedded controller;
   a first hardware comparator, connected between the lock register and the key register, configured to receive the password from the lock register and to receive the key from the key register, wherein the first hardware comparator is further configured to compare the password with the key in the single machine cycle, wherein the first hardware comparator is further configured to output an enable signal for the single machine cycle to the enable input of the access filter if the key and password match;
   a second hardware comparator configured to output a first signal if the password stored in the lock register is not equal to the null value;
   a logical OR-gate device having an output coupled with the block input, a first input receiving the first signal, and a second input receiving a second signal when the system is suspected of being compromised, wherein the block input is asserted when any of the first signal or second signal is received.

2. The system of claim 1 further comprising an access interface connected between the nonvolatile memory and the embedded controller configured to provide communication between the embedded controller and the nonvolatile memory.

3. The system of claim 1 further comprising a communication bus configured to interconnect the embedded controller, the access interface, and the key register.

4. The system of claim 1, wherein the second hardware comparator is further configured to compare the password with a null value before the controller begins its function.

5. The system of claim 1, wherein the second hardware comparator is configured to output the first block signal after a reset if the contents of the lock register are not equal to a null value.

6. The system of claim 1, wherein the logical OR-gate is connected between the access filter device and the second hardware comparator, the output of the OR-gate is connected to the access filter device and one input of the OR-gate is connected to the output of the second hardware comparator.

7. The system of claim 6, wherein the external input of the OR gate is provided by at least one of the hardware or firmware upon detection of an external debugger or software update.

8. The system of claim 7, wherein the second input of the OR-gate is generated based on whether the system is suspected of being compromised as indicted by the detection of an external debugger, a firmware update, or a software update.

9. A method for controlling access to a nonvolatile memory by an embedded system, the method comprising:
   retrieving and storing, by a lock register, a password from the nonvolatile memory;
   receiving, by a key register, a key from an embedded controller, wherein the key is held in the key register for only a single machine cycle associated with the embedded controller;
   comparing, by a first hardware comparator, the password in the lock register with the key in the key register for the single machine cycle, wherein the key is available only for the single machine cycle;
   outputting, at an output of the first hardware comparator, an enable signal for the single machine cycle to the access filter if the key and password match;
   comparing, by a second hardware comparator, the password retrieved from the nonvolatile memory with a null value;
   outputting, by the first hardware comparator, a first signal if the password is not equal to the null value;
   receiving, at a first input of a logical OR-gate device, the first signal from the first hardware comparator;
   receiving, at a second input of the logical OR-gate device, a second signal when the system is suspected of being compromised;
   generating, at an output of the logical OR-gate device, a block signal when any of the first signal or second signal is received;

blocking, by an access filter device having a block input coupled to the output of the logical OR-gate device and an enable input coupled to the output of the first hardware comparator, access to the nonvolatile memory when the block signal is received; and enabling, by the access filter device, access to the nonvolatile memory for the single machine cycle when the enable signal is received on the enable input of the access filter device.

10. The method of claim 9 further comprising indicating the system is suspected of being compromised when an external debugger is detected at a system port.

11. The method of claim 9 further comprising indicating the system is suspected of being compromised when a software or firmware update request is received by the embedded controller.

12. The method of claim 9, wherein comparing the password with the null value is carried out before the embedded controller begins its functions.

\* \* \* \* \*